United States Patent
Kang et al.

(10) Patent No.: US 11,679,754 B2
(45) Date of Patent: Jun. 20, 2023

(54) HYBRID VEHICLE AND DRIVING CONTROL METHOD THEREFOR

(71) Applicants: Hyundai Motor Company, Seoul (KR); Kia Motors Corporation, Seoul (KR)

(72) Inventors: Ji Hoon Kang, Seoul (KR); Jea Mun Lee, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 442 days.

(21) Appl. No.: 16/667,418

(22) Filed: Oct. 29, 2019

(65) Prior Publication Data
US 2020/0180599 A1 Jun. 11, 2020

(30) Foreign Application Priority Data
Dec. 7, 2018 (KR) .................. 10-2018-0156795

(51) Int. Cl.
*B60W 10/16* (2012.01)
*B60K 6/387* (2007.10)
(Continued)

(52) U.S. Cl.
CPC .............. *B60W 20/16* (2016.01); *B60K 6/22* (2013.01); *B60W 20/10* (2013.01); *B60Y 2200/92* (2013.01)

(58) Field of Classification Search
CPC .... B60W 20/16; B60W 20/40; B60W 200/17; B60W 2556/60; B60W 20/10;
(Continued)

(56) References Cited

U.S. PATENT DOCUMENTS 6,518,732 B2 * 2/2003 Palanisamy ......... H02J 7/00719
320/147
8,271,178 B2 * 9/2012 Matsubara ............. B60K 6/445
701/79
(Continued)

FOREIGN PATENT DOCUMENTS

CN   104071150 A  * 10/2014   ........... B60W 10/06
CN   104828075 A  *  8/2015
(Continued)

OTHER PUBLICATIONS

Development of eco-driving control system for connected and automated hybrid electric vehicles by S Wang—2020—ir.library. dc-uoit.ca (Year: 2020).*
(Continued)

*Primary Examiner* — Cuong H Nguyen
(74) *Attorney, Agent, or Firm* — Fox Rothschild LLP

(57) ABSTRACT

A driving control method of a hybrid vehicle is provided. The method includes when a specific zone related to discharge of exhaust gas is detected ahead on a path, determining whether a current state of charge (SoC) of a battery is greater than a first value. When the current SoC is greater than the first value, driving in a first mode for charging the battery in power of an engine in a first section disposed before entrance into the specific zone. Upon entering a second section corresponding to the specific zone, a current mode into a second mode for driving using power of a motor only is converted, battery consumption is reduced using at least one step along with a change in the current SoC in the second section.

13 Claims, 6 Drawing Sheets

(51) Int. Cl.
   *B60W 20/16*  (2016.01)
   *B60K 6/22*  (2007.10)
   *B60W 20/10*  (2016.01)

(58) Field of Classification Search
   CPC ...... B60W 20/13; B60W 20/19; B60W 20/15; B60W 2520/10; B60W 2520/105; B60W 2540/10; B60K 6/387; B60K 6/442; B60Y 2200/92; Y02T 10/62; Y02T 10/70; Y02T 10/88; B60H 1/004; B60L 1/00
   USPC .......................................................... 701/22
   See application file for complete search history.

(56) References Cited

U.S. PATENT DOCUMENTS

| | | | | |
|---|---|---|---|---|
| 8,311,694 | B2 * | 11/2012 | Imai | B60L 50/61 701/22 |
| 8,634,978 | B2 * | 1/2014 | Matsubara | B60L 50/16 701/54 |
| 8,812,203 | B2 * | 8/2014 | Minamikawa | B60W 30/19 701/55 |
| 8,948,943 | B2 * | 2/2015 | Takagi | B60W 20/00 180/65.23 |
| 9,026,291 | B2 * | 5/2015 | Hayashi | B60W 20/00 701/22 |
| 9,565,988 | B2 * | 2/2017 | Park | A47L 15/16 |
| 9,892,609 | B2 * | 2/2018 | Kim | G08B 21/0453 |
| 10,562,518 | B2 * | 2/2020 | Kang | B60W 20/40 |
| 10,688,981 | B2 * | 6/2020 | Lee | B60W 40/107 |
| 10,692,367 | B2 * | 6/2020 | Nguyen | G08G 1/08 |
| 10,787,166 | B2 * | 9/2020 | Lee | B60W 10/02 |
| 10,829,108 | B2 * | 11/2020 | Kim | F02N 11/0837 |
| 10,974,715 | B2 * | 4/2021 | Park | B60W 20/12 |
| 11,161,497 | B2 * | 11/2021 | Lee | B60W 20/50 |
| 2008/0300761 | A1 * | 12/2008 | Matsubara | B60K 6/445 701/61 |
| 2011/0231048 | A1 * | 9/2011 | Matsubara | B60K 6/365 903/902 |
| 2011/0251747 | A1 * | 10/2011 | Imai | B60K 6/365 180/65.285 |
| 2012/0072065 | A1 * | 3/2012 | Minamikawa | B60K 6/547 903/903 |
| 2013/0179055 | A1 * | 7/2013 | Kato | B60W 30/19 701/113 |
| 2013/0226387 | A1 * | 8/2013 | Hayashi | B60W 50/06 180/65.23 |
| 2013/0304293 | A1 * | 11/2013 | Yoshikawa | B60W 10/02 701/22 |
| 2015/0094892 | A1 * | 4/2015 | Kanehara | B60W 30/182 180/65.265 |
| 2020/0349833 | A1 * | 11/2020 | Lerner | G06N 20/00 |

FOREIGN PATENT DOCUMENTS

| | | | | |
|---|---|---|---|---|
| CN | 104071150 | B | * 4/2017 | ............ B60W 10/06 |
| CN | 107914704 | A | * 4/2018 | ............ B60W 20/20 |
| CN | 110061531 | A | * 7/2019 | |
| JP | H 07-107617 | A | 4/1995 | |
| JP | H 08-240435 | A | 9/1996 | |
| JP | 2010169419 | A | * 8/2010 | ............ G01C 21/26 |
| JP | 2012236513 | A | * 12/2012 | ............ B60H 1/004 |
| JP | 2013049381 | A | * 3/2013 | |
| JP | 2016222001 | A | * 12/2016 | |
| KR | 102237065 | B1 | * 4/2021 | ............ B60W 20/13 |

OTHER PUBLICATIONS

L. Thibault, P. Degeilh, O. Lepreux, L. Voise, G. Alix and G. Corde, "A new GPS-based method to estimate real driving emissions," 2016 IEEE 19th International Conference on Intelligent Transportation Systems (ITSC), 2016, pp. 1628-1633, doi: 10.1109/ITSC. 2016.7795776. (Year: 2016).*

C. Wu, Y. Hung and S. Chen, "Rapid-prototyping designs for the three-power-source hybrid electric scooter with a fuzzy-control energy management," 2016 International Conference on Applied System Innovation (ICASI), 2016, pp. 1-4, doi: 10.1109/ICASI. 2016.7539930. (Year: 2016).*

A. Schlote et al., "Cooperative Regulation and Trading of Emissions Using Plug-in Hybrid Vehicles," in IEEE Transactions on Intelligent Transportation Systems, vol. 14, No. 4, pp. 1572-1585, Dec. 2013, doi: 10.1109/TITS.2013.2264754; (Year: 2013).*

English translation version of CN-104828075-A, inventor Yan Erdong. (Year: 2015).*

C. Pang, P. Dutta and M. Kezunovic, "BEVs/PHEVs as Dispersed Energy Storage for V2B Uses in the Smart Grid," in IEEE Transactions on Smart Grid, vol. 3, No. 1, pp. 473-482, Mar. 2012, doi: 10.1109/TSG.2011.2172228. (Year: 2012).*

L. Li, S. Coskun, F. Zhang, R. Langari and J. Xi, "Energy Management of Hybrid Electric Vehicle Using Vehicle Lateral Dynamic in Velocity Prediction," in IEEE Transactions on Vehicular Technology, vol. 68, No. 4, pp. 3279-3293, Apr. 2019, doi: 10.1109/ TVT.2019.2896260 (Year: 2019).*

Office Action dated Apr. 19, 2023 in corresponding Korean Application No. 10-2018-0156795.

\* cited by examiner

HYBRID VEHICLE AND DRIVING CONTROL METHOD THEREFOR

CROSS-REFERENCE TO RELATED APPLICATION(S)

This application claims the benefit of Korean Patent Application No. 10-2018-0156795, filed on Dec. 7, 2018, which is hereby incorporated by reference as if fully set forth herein.

BACKGROUND

Field of the Invention

The present invention relates to a hybrid vehicle and a driving control method therefor, and more particularly, to a hybrid vehicle and a driving control method therefor, for managing a battery state based on a specific zone in which reduction in exhaust gas discharging is recommended or reinforced.

Discussion of the Related Art

In general, a hybrid electric vehicle (HEV) refers to a vehicle that uses two power sources that mainly include an engine and an electric motor. An HEV has improved fuel efficiency and engine performance compared with a vehicle including only an internal combustion engine and is also advantageous for reducing exhaust gas and, thus, has been actively developed recently.

A hybrid vehicle travels in two modes according to a powertrain used to drive the vehicle. One of the modes is an electric vehicle (EV) mode in which the vehicle travels using only an electric motor and the other mode is a hybrid electric vehicle (HEV) mode of operating both an electric motor and an engine to acquire power. A hybrid vehicle switches between the two modes based on driving conditions.

The switch between driving modes is generally performed to maximize fuel consumption or driving efficiency based on the efficiency characteristics of a powertrain. As a result, control methods for switch between driving modes focus on efficiency for an operation of an eco-friendly vehicle but, are much different from an ultimate future target of an eco-friendly vehicle.

Needless to say, a method of forcibly driving a vehicle in an EV mode according to driver selection in a specific section using a manual mode change button included in the vehicle may also be considered but, the method has degraded convenience and has difficulty in pre-ensuring a state of charge (SoC) required to complete the whole zone, in which exhaust gas is ideally reduced, in an EV mode if possible. In addition, when a vehicle enters the corresponding zone and the SoC required to complete the zone in only a general EV mode is not ensured, an engine needs to be driven.

SUMMARY

Accordingly, the present invention is directed to a hybrid vehicle and a driving control method therefor that substantially obviates one or more problems due to limitations and disadvantages of the related art. An object of the present invention is to provide a driving control method and a hybrid vehicle therefor, for maximizing a driving distance using only a motor when the vehicle is being driven in a zone in which engine driving is limited.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

In accordance with the purpose of the invention, a driving control method of a hybrid vehicle may include, when a specific zone related to discharge of exhaust gas is detected ahead on a path, determining whether a current state of charge (SoC) of a battery is greater than a first value; when the current SoC is greater than the first value, driving in a first mode to charge the battery with power of an engine in a first section disposed before entrance into the specific zone; upon entering a second section that corresponds to the specific zone, converting a current mode into a second mode for driving the vehicle using power of a motor; and performing control to reduce battery consumption using at least one step along with a change in the current SoC in the second section.

In another aspect of the present invention, a hybrid vehicle may include an engine, a motor, and a hybrid controller configured to determine whether a current state of charge (SoC) of a battery is greater than a first value when a specific zone related to discharge of exhaust gas is detected ahead on a path, to drive the vehicle in a first mode to charge the battery in power of an engine in a first section disposed before entrance into the specific zone when the current SoC is greater than the first value, to convert a current mode into a second mode for driving the vehicle using power of a motor upon entering a second section that corresponds to the specific zone, and to perform control to reduce battery consumption using at least one step along with a change in the current SoC in the second section.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
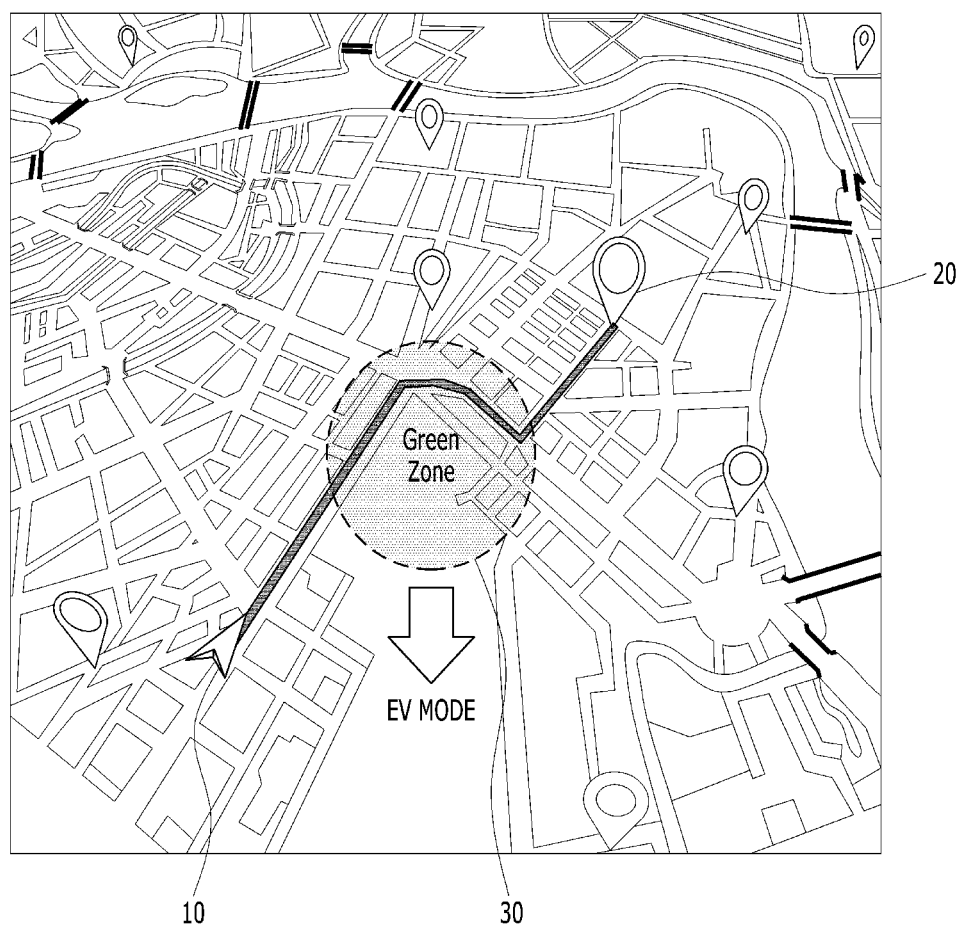
FIG. 1 is a diagram a concept of a specific zone to which exemplary embodiments of the present invention are applicable.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Exemplary embodiments of the present invention are described in detail so as for those of ordinary skill in the art to easily implement with reference to the accompanying drawings. However, the present invention may be implemented in various different forms and is not limited to these embodiments. To clearly describe the present invention, a part without concerning to the description is omitted in the drawings, and like reference numerals in the specification denote like elements.

In addition, when a certain part "includes" a certain component, this indicates that the part may further include another component instead of excluding another component unless there is no different disclosure. The same reference numbers will be used throughout the drawings and the specification to refer to the same parts.

Exemplary embodiments of the present invention propose a method and a hybrid vehicle for performing the same, for reducing power consumption in consideration of a state of a battery to maximize a driving distance in an electric vehicle (EV) mode for driving in a zone that is affected by discharge of exhaust gas when the corresponding zone is positioned on a driving path of a vehicle.

Prior to a description of a driving control method according to an exemplary embodiment of the present invention, a concept of a zone that is affected by discharge of exhaust gas, and the configuration and control system of a hybrid vehicle, which are applicable to exemplary embodiments, will be described. First, with reference to FIG. 1, a concept of a zone in which engine driving needs to be limited will be described. FIG. 1 is a diagram of a concept of a specific zone to which exemplary embodiments of the present invention are applicable.

Referring to FIG. 1, according the exemplary embodiments of the present invention, a specific zone 30 in which discharge of exhaust gas needs to be reduced or to be inhibited is assumed to be present between a departure point 10 and a destination 20. The specific zone 30 may be a preset zone or may be variably set based on a current/recent situation. In particular, the preset zone may correspond to a zone that is set according to laws and regulations, government policy, or the like (e.g., a zone in which exhaust gas is managed, such as London or Seoul), a zone in which exhaust gas needs to be reduced due to the characteristics of the zone (e.g., a children protection zone, an indoor parking lot, or a residential zone), and on the like. In addition, the variably set zone may correspond to a zone in which whether the zone is currently set is capable of being detected through radio information such as telematics, a pedestrian congested area determined through a vision information acquisition apparatus (an advanced driver assistance systems (ADAS) system or the like) installed in a vehicle, and so on.

For example, when a corresponding zone is determined as a pedestrian congested area based on big data using position information of a smartphone, or when a substantial amount of exhaust gas is estimated to be generated based on vehicle average speed and a traffic volume, which are collected via a telematics service or the like, the corresponding zone may be set to the specific zone 30. The specific zone 30 may be set in units of arbitrary administrative districts, may be set to a section formed by connecting a plurality of coordinates as boundary points, or may be set to a zone within a predetermined radius distance from an entire/partial portion of specific facilities or specific facilities/coordinates.

The aforementioned setting of the specific zone is exemplary and exemplary embodiments of the present invention are not limited by a setting reference, a setting range, a setting period, or the like of the specific zone. The specific zone 30 may be assumed to be positioned between the departure point 10 and the destination 20 but, it may not necessarily be required to explicitly set the destination 20 by a user on a navigation function of an audio/video/navigation (AVN) system. For example, the destination 20 may be arbitrarily set in a vehicle based on a driving pattern of a driver or a preset driving condition (a time, a zone, or the like). Information regarding whether the specific zone 30 is on a path and a range thereof may be acquired by the vehicle prior to entrance into the corresponding zone or may be dynamically recognized based on a surrounding situation.

Figure 2:
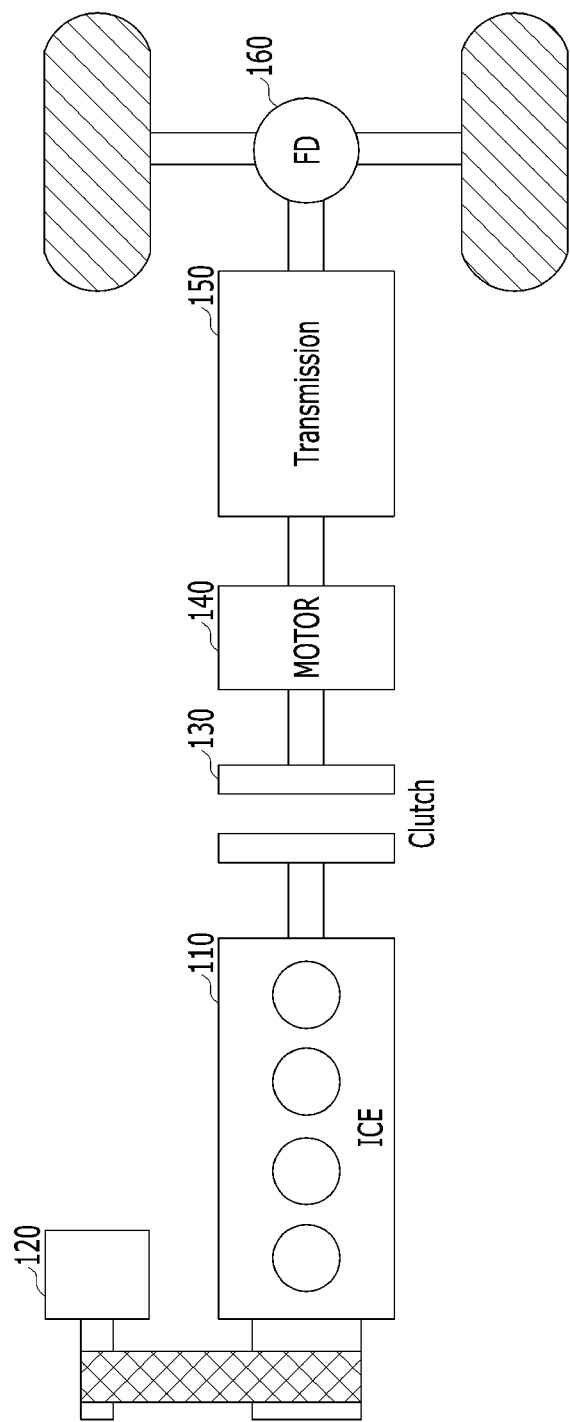
FIG. 2 is a diagram illustrating a powertrain structure of a hybrid vehicle to which exemplary embodiments of the present invention are applicable.

A more detailed method of determining the specific zone 30 will be described with reference to FIG. 4. Hereinafter, for convenience, a specific zone in which discharge of exhaust gas needs to be reduced/prohibited will be referred to as a "green zone". Hereinafter, a hybrid vehicle to which exemplary embodiments of the present invention are applicable will be described with reference to FIG. 2. FIG. 2 is a diagram illustrating an example of a powertrain structure of a hybrid vehicle to which exemplary embodiments of the present invention are applicable.

Referring to FIG. 2, the drawing illustrates a powertrain of a hybrid vehicle employing a parallel type hybrid system including an electric motor 140 (or a driving motor) and an engine clutch 130 installed between an internal combustion engine (ICE) 110 and a transmission 150. In such a vehicle, in general, when a driver engages an accelerator after turning on the vehicle, the motor 140 may be driven using power of a battery while the engine clutch 130 is open and transmit power to move wheels through the transmission 150 and a final drive (FD) 160 (i.e., EV mode). As the vehicle gradually accelerates, high traction force is further required and, thus, an auxiliary motor (or a starter generator motor 120) may be operated to drive the engine 110.

Accordingly, when rotational speeds of the engine 110 and the motor 140 are equal to each other, the engine clutch 130 may be engaged such that both the engine 110 and the motor 140 drive the vehicle (i.e., transition to an HEV mode from an EV mode). When a predetermined engine off condition such as vehicle deceleration is satisfied, the engine clutch 130 is open and the engine 110 stops (i.e., transition to an EV mode from an HEV mode). In addition, the hybrid vehicle converts traction force of a wheel into electric energy to recharge a battery, which is referred to as braking energy regeneration or regenerative braking.

The starter generator motor 120 may operate as a starter motor when the engine is turned on and may operate as a generator after the engine is turned on or when rotational energy is recovered during engine off. Thus, the starter generator motor 120 may also be referred to as a hybrid starter generator (HSG) and, as necessary, may be referred to as an auxiliary motor.

Figure 3:
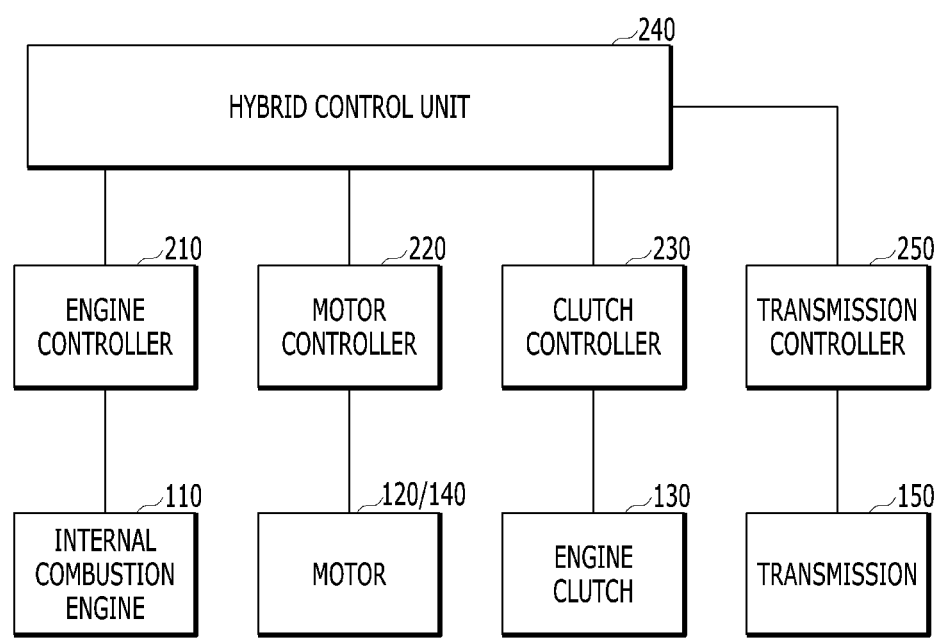
FIG. 3 is a block diagram showing an example of a control system of a hybrid vehicle to which exemplary embodiments of the present invention are applicable.

A relationship between controllers of a vehicle including the aforementioned powertrain is shown in FIG. 3. FIG. 3 is a block diagram showing an example of a control system of a hybrid vehicle to which exemplary embodiments of the present invention are applicable.

Referring to FIG. 3, in the hybrid vehicle to which exemplary embodiments of the present invention are applicable, the internal combustion engine 110 may be operated by an engine controller 210, torque of the starter generator motor 120 and the motor 140 may be adjusted and operated by a motor control unit (MCU) 220, and the engine clutch 130 may be operated by a clutch controller 230. In particular, the engine controller 210 may also be referred to as an engine management system (EMS). In addition, the transmission 150 may be operated by a transmission controller 250. As necessary, the starter generator motor 120 and the motor 140 may be operated by different separate motor controllers.

Each controller may be connected to a hybrid control unit (HCU) 240 configured to execute an overall mode switching procedure as a high-level controller and provide information required to switch driving modes. Additionally, the HCU may be configured to operate an engine clutch during gear shift, and/or information required to execute engine off or perform an operation according to a control signal under control of a hybrid controller 240. In particular, the hybrid controller 240 may be configured to determine whether modes are switched based on a driving state of a vehicle.

For example, the hybrid controller may be configured to determine an open time of the engine clutch (EC) 130 and may be configured to adjust hydraulic pressure (in the case of a wet EC) or adjust torque capacity (in the case of a dry EC) when the EC is open. The hybrid controller 240 may be configured to determine an EC state (lock-up, slip, open, etc.) and adjust a time for stop of fuel injection of the engine 110. Additionally, the hybrid controller may be configured to transmit a torque command for adjusting torque of the starter generator motor 120 to the MCU 220 to execute engine off and control engine rotational energy recovery. In addition, the hybrid controller 240 may be configured to determine a mode switching condition during control of driving mode switching and operate a low-level controller for mode switching.

Furthermore, it would be obvious to one of ordinary skill in the art that the aforementioned relationship between the controllers and functions/divisions of the controllers are exemplary and, thus, are not limited to the terms. For example, the hybrid controller 240 may be embodied by allowing any one of other controllers except for the hybrid controller 240 to provide a corresponding function or two or more of other controllers may distribute and provide the corresponding function.

Hereinafter, a driving control method according to exemplary embodiment of the present invention will be described with reference to FIGS. 4 to 6. FIG. 4 is a diagram of a concept of a green zone (GZ) preparation section and a GZ zone according to an exemplary embodiment of the present invention.

Figure 4:
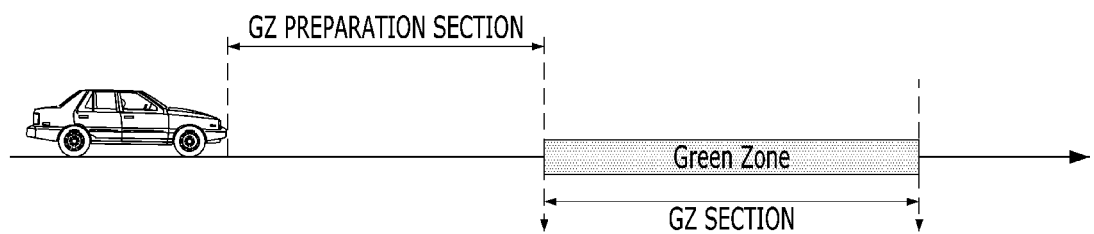
FIG. 4 is a diagram of a concept of a green zone (GZ) preparation section and a GZ zone according to an exemplary embodiment of the present invention.

Referring to FIG. 4, a remaining distance to a start point of the GZ section from a current position of a hybrid vehicle may be referred to as the GZ preparation section. In particular, when a state of charge (SoC) that corresponds to the sum of energy for driving in the GZ section only in the EV mode and a preset minimum SoC (hereinafter, referred to as "Ext. Min SOC") of a battery is ensured prior to entrance into the GZ section, the hybrid vehicle may complete the whole GZ section in the EV mode.

Accordingly, when an SoC for completing the whole GZ section in the EV mode from the current position of the hybrid vehicle is ensured, the hybrid vehicle may complete the whole GZ section in the EV mode by managing the hybrid vehicle to prevent the SoC from being further reduced in the GZ preparation section. When the SoC for completing the whole GZ section in the EV mode from the current position of the hybrid vehicle is not ensured, the hybrid vehicle needs to charge (i.e., to charge in an HEV series mode) a battery with a portion of power of an engine 110 using a motor 120 and/or 140 to ensure an insufficient SoC in the GZ preparation section. However, even when charging is performed by a maximum degree as much as circumstances allows in the GZ preparation section, when the SoC for completing the whole GZ section in the EV mode is not ensured, the hybrid vehicle needs to drive an engine and to pass a distance that corresponds to an insufficient SoC.

Accordingly, according to proposal of exemplary embodiments of the present invention, when a green zone is detected ahead and the SoC for completing the green zone in the EV mode is not ensured, charging in the GZ preparation section may be performed and, in this case, a driving distance in the EV mode may be increased by inactivating electric power load and adjusting a driving point of a motor when a vehicle drives in the EV mode at least after entering the green zone. A method of managing a battery state for increasing a driving distance in an EV mode according to an exemplary embodiment will be described with reference to FIG. 5.

Figure 5:
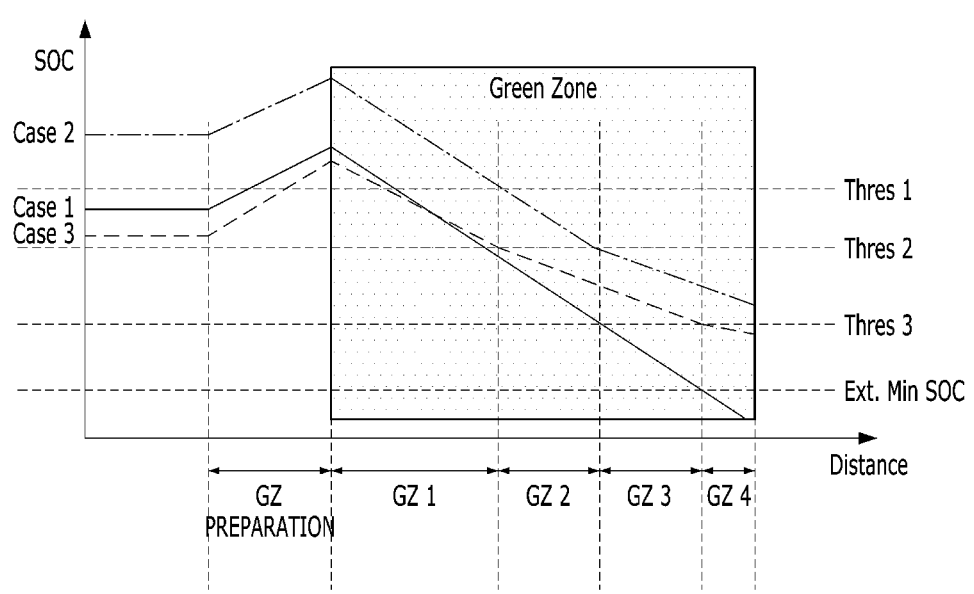
FIG. 5 is a graph showing examples of aspects in which a method of managing a battery state is performed according to an exemplary embodiment of the present invention.

FIG. 5 is a graph showing examples of aspects in which a method of managing a battery state is performed according to an exemplary embodiment of the present invention. In FIG. 5, a horizontal axis is a distance, a vertical axis is an SoC of a battery, and plots respectively that corresponds to a total of three types of battery management cases (Cases 1, 2, and 3) are shown. In particular, Ext. Min SOC of the vertical axis is the preset SoC value as described above and, when a SoC reaches the corresponding value, the hybrid vehicle may drive an engine.

Particularly, a first case (Case 1) indicates the case in which general driving control is performed. A second case (Case 2) indicates the case in which driving control according to an exemplary embodiment is performed when an SoC at a start time point of the GZ preparation section is equal to or greater than a first threshold value (Thres 1). A third case (Case 3) indicates the case in which driving control according to an exemplary embodiment is performed when an SoC at a start time point of the GZ preparation section is less than the first threshold value (Thres 1).

In particular, the first threshold value (Thres 1) may refer to a SoC prior to entrance into the GZ preparation section, for ensuring a minimum SoC for completing the whole GZ section in the EV mode when charging is performed by a maximum degree in the HEV mode in the GZ preparation section. In other words, when a SoC of the GZ preparation section is added to the first threshold value, the first threshold value may be set to satisfy the minimum SoC for completing the whole GZ section in the EV mode. In other words, when a SoC that corresponds to the first threshold value is ensured at a start point of the GZ preparation section, if the hybrid vehicle drives in the complete GZ section in the EV mode after charging a battery with power of an engine in the GZ preparation section, a SoC at an end point of the GZ section may be Ext. Min SOC. In some exemplary embodiments, the first threshold value may also be set to a value obtained by adding a predetermined margin SoC to a SoC that satisfies the aforementioned condition or subtracting the predetermined margin SoC from the SoC that satisfies the aforementioned condition.

Accordingly, a hybrid controller 240 according to an exemplary embodiment may be configured to acquire road information (i.e., a length, a slope, a congestion degree, or the like) regarding the GZ preparation section and the GZ section through a navigation system or a telematics service and may be configured to determine a chargeable amount of the GZ preparation section and a SoC required for driving in the complete GZ section in the EV mode based on the acquired information.

The GZ preparation section may be set to a preset distance from the start point of the GZ section or may be a point at which the hybrid vehicle detects a front GZ section but, this is merely exemplary and the present invention is not limited thereto. In addition, four sub sections GZ1, GZ2, GZ3, and GZ4 in the GZ section may be set based on the a point at which a SoC reaches the second threshold value or the third threshold value in each Case for convenience of description. It may be sufficient to satisfy a condition in which the second threshold value (Thres 2) is less than the first threshold value (Thre1) and the third threshold value (Thres 3) is decreased and, thus, the sub sections GZ1, GZ2, GZ3, and GZ4 may be variably set by one of ordinary skill in the art.

Hereinafter, aspects for managing a SoC for each Case will be described in detail. First, in Case 1, management of a SoC according to the aforementioned exemplary embodiment is not managed except that charging using power of an engine is performed in the GZ preparation section. Accordingly, when entering the GZ preparation section with a lower SoC than the first threshold value (Thres 1), a general hybrid vehicle is not capable of completing the GZ section in the EV mode, reaches Ext. Min SOC in a section of GZ 3, and drives the engine to travel in a second of GZ 4 even when charging is performed in the GZ preparation section.

In Case 2, a hybrid vehicle according to an exemplary embodiment enters the GZ preparation section with a SoC equal to or greater than the first threshold value (Thres 1) and, thus, may be configured to perform charging in the GZ preparation section using a general manner. Then, when entering the GZ section, the hybrid vehicle may be driven in a general EV mode for a time period (i.e., sections GZ1 and GZ2) in which a SoC is equal to or greater than the second threshold value (Thres 2). Accordingly, a change inclination of a SoC in the GZ preparation section and sections GZ1 and GZ2 is similar to in Case 1. However, when an SOC is less than the second threshold value (Thres 2) (i.e., GZ3 section and thereafter), the hybrid vehicle may block electric power load that is not related to driving to increase a driving distance in the EV mode.

The electric power load that is not related to driving may be multimedia load, air-conditioning load, or the like but, this is merely exemplary and is not limited thereto. Accordingly, it may be seen that, in the GZ3 section and thereafter, a change inclination of a SoC becomes gradual compared with a previous section (i.e., SOC consumption is reduced) and, thus, an available driving distance in the EV mode may be increased.

In Case 3, the hybrid vehicle according to an exemplary embodiment enters the GZ preparation section with a SoC less than the first threshold value (Thres 1). Accordingly, the hybrid vehicle may primarily block at least some of electric power load that is not related to driving, in the GZ preparation section. In particular, a type of the blocked electric power load may have a narrower range than or the same range as in the case in which a SoC is less than the second threshold value (Thres 2) in Case 2. Along with blocking of the electric power load, a rising inclination of a SoC in the GZ preparation section may be steeper than in Cases 1 and 2. Such primary blocking of electric power load may also be maintained after entrance into the GZ section.

Accordingly, a falling inclination of a SoC in the GZ1 section may be more gradual than in Cases 1 and 2. Then, when a SoC is less than the second threshold value (Thres 2) (i.e., sections GZ2 and GZ3), the hybrid vehicle may secondarily block electric power load that is not related to driving. In particular, a range of the blocked electric power load may be the same as the range of the blocked electric power load when a SoC is less than the second threshold value (Thres 2) in Case 2. Then, when a SoC is less than the third threshold value (Thres 3) again (i.e., GZ4 section), the hybrid vehicle may be configured to restrict a driving point of the motor 140. Particularly, restriction of the driving point may indicate that a driving point with predetermined efficiency or less is not allowed to be used among driving points of the motor 140.

Therefore, the hybrid controller 240 may be configured to restrict accelerating force or maximum velocity within a predetermined value or change torque requirement based on manipulation of an accelerating pedal to a value by which entrance into a motor low-efficiency section is not allowed. Since blocking of electric power load is maintained, entrance into the low-efficiency section is not allowed up to a motor driving point and, thus, a falling inclination of a SoC in the corresponding section (i.e., the GZ4 section) may be more gradual than before. As a result, in Case 3, when the hybrid vehicle enters the GZ preparation section, a SoC is less than Case 1 but, the hybrid vehicle may be driven for a longer distance in the EV mode.

Although not illustrated, needless to say, even in Case 2, when a SoC is less than the third threshold value (Thres 3) after entrance into the GZ section, the motor driving point may be restricted. In addition, types of loads that are blocked before electric power load is blocked or types of inconvenience that a driver may experience based thereon may be guided to the driver through various output units. Similarly, when the motor driving point is restricted, the hybrid vehicle according to an exemplary embodiment may be configured to notify the driver regarding the restriction. For example, the hybrid vehicle according to an exemplary embodiment may be configured to visually output notification information that indicates the possibility that air conditioning or acceleration is not satisfied through a display of a cluster or an audio-video-navigation (AVN) system, or the like, or may be configured to output a sound warning message through a speaker.

Figure 6:
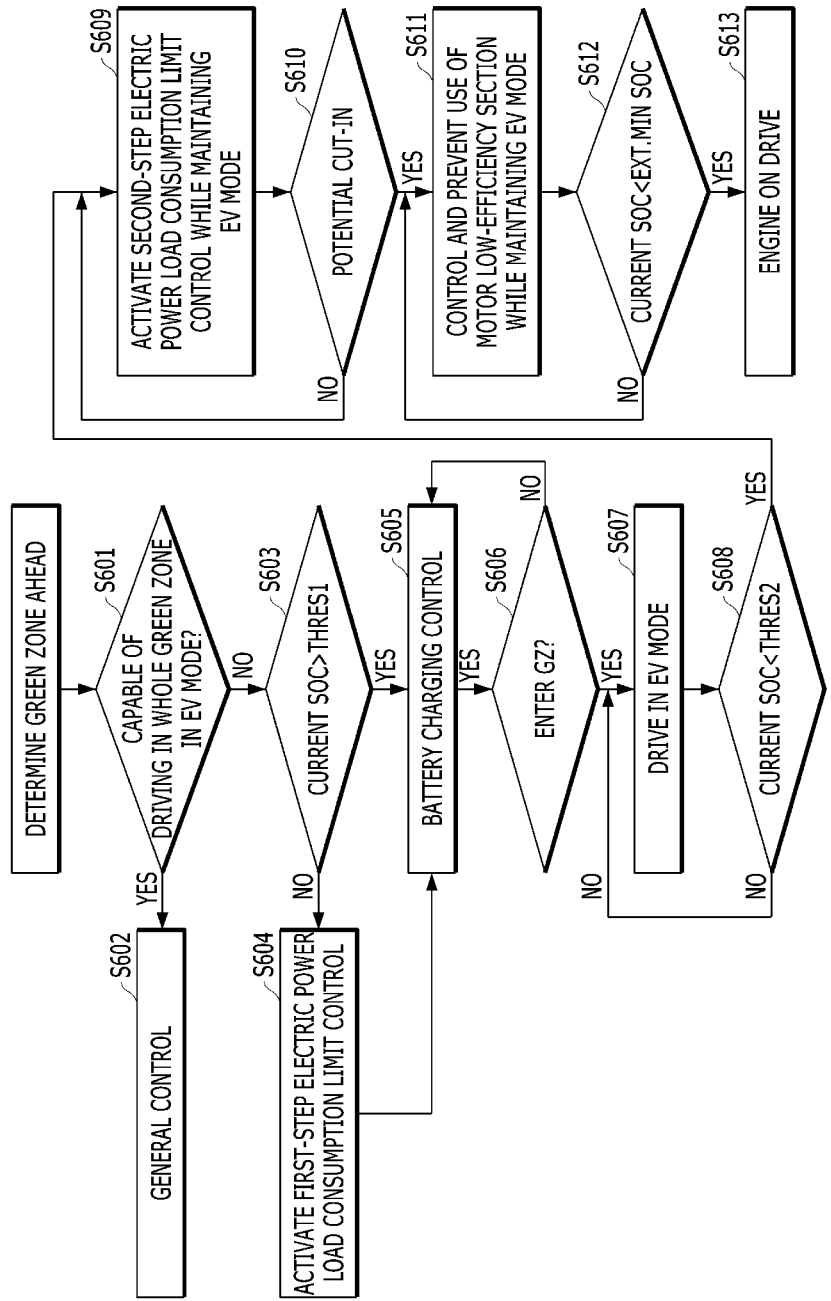
FIG. 6 is a flowchart showing a driving control method along with entrance into a green zone according to an exemplary embodiment of the present invention.

A flowchart of the method of managing a SoC according to an exemplary embodiment, which has been described thus far, is shown in FIG. 6. FIG. 6 is a flowchart showing a driving control method along with entrance into a green zone according to an exemplary embodiment of the present invention. In FIG. 6, the meaning of each threshold value is the same as the above description given with reference to FIG. 5 and, thus, a repeated description is omitted.

Referring to FIG. 6, when a green zone is detected ahead, the hybrid controller 240 may be configured to determine whether a hybrid vehicle is capable of driving in the whole green zone in the EV mode using a current SOC (S601). In response to determining that the vehicle is capable of driving (YES of S601), general driving control may be performed to maintain the current SOC (S602). For example, the general driving control may be charge sustaining (CS) mode driving.

When the vehicle is not capable of driving in the complete green zone in the EV mode using a current SOC, whether the current SoC is greater than the first threshold value (Thres 1) may be determined (S603). When the SOC is less than the first threshold value (NO of S603), first-step electric power load consumption limit control may be activated to block some of electric power load that is not related to driving (S604) and, then, battery charging control may be initiated (S605). When the current SoC is greater than the first threshold value (Thres 1) (YES of S603), battery charging control may be immediately initiated without first-step electric power load block (S605). As described above, the battery charging control may indicate that charging is performed through at least one of the HSG 120 or the motor 140 using at least some of power of an engine.

When the vehicle enters the green zone while battery charging control is performed (S606), EV mode driving may be performed (S607). When the current SoC is less than the second threshold value while the vehicle is driven in the green zone in the EV mode (YES of S608), second-step electric power load consumption limit control may be activated (S609). In particular, the second-step electric power load consumption limit may be configured to block electric power load in a wider range than the first-step electric power load consumption limit but, in some exemplary embodiments, ranges for blocking electric power load in the two steps may be the same.

While EV mode driving is continuously performed in a state in which second-step electric power load consumption limit control is activated, when the current SoC is less than the third threshold value (Thres 3) (YES of S610), use of the motor low-efficiency section may be prevented (S611).

While EV mode driving is continuously performed in a state in which second-step electric power load consumption limit control and control for preventing use of the motor low-efficiency section are activated, when the current SoC is less than Ext. Min SOC (S612), an engine may be driven and, simultaneously, a current mode may be converted into the HEV mode (S613).

The above configured hybrid vehicle related to at least one exemplary embodiment may ensure a SoC based on a battery state prior to entrance into a zone in which engine driving is restricted and may minimize battery consumption after entrance into the zone, thereby maximizing a driving distance using a motor only. It will be appreciated by persons skilled in the art that that the effects that could be achieved with the present invention are not limited to what has been particularly described hereinabove and other advantages of the present invention will be more clearly understood from the detailed description.

The aforementioned present invention can also be embodied as computer readable code stored on a non-transitory computer readable recording medium. The non-transitory computer readable recording medium is any data storage device that can store data which can thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

It will be apparent to those skilled in the art that various modifications and variations may be made in the present invention without departing from the spirit or scope of the inventions. Thus, it is intended that the present invention cover the modifications and variations of this invention provided they come within the scope of the appended claims and their equivalents.

What is claimed is:

1. A driving control method of a hybrid vehicle, comprising:
   detecting, by a controller, a specific zone related to discharge of exhaust gas ahead on a path;
   determining, by the controller, whether a current state of charge (SoC) of a battery is greater than a first value;
   when the current SoC is greater than the first value, driving, by the controller, in a first mode for charging the battery with power of an engine in a first section disposed before entrance into the specific zone;
   upon entering a second section that corresponds to the specific zone, converting, by the controller, a current mode into a second mode for driving using power of a motor only; and
   reducing, by the controller, battery consumption using at least one step along with a change in the current SoC in the second section;
   wherein the first value is a target minimum SOC at an end point of the second section when completing driving of the whole second section in the second mode;
   wherein when the current SoC is equal to or less than the first value, blocking, by the controller, electric power load in a preset first range from the first section,
   wherein reducing battery consumption includes:
   blocking, by the controller, electric power load in a preset second range when the current SoC is less than a second value in the second section, wherein the second value is less than the first value, and
   preventing, by the controller, use of a preset motor low-efficiency section when the current SoC is than a third value in the second section, wherein the third value is less than the second value; and wherein the controller is configured to restrict accelerating force or maximum velocity within a predetermined value or change torque requirement based on manipulation of an accelerating pedal to a value by which entrance into the motor low-efficiency section is now allowed.

2. A hybrid vehicle, comprising:
an engine;
a motor; and
a hybrid controller configured to:
  determine whether a current state of charge (SoC) of a battery is greater than a first value when a specific zone related to discharge of exhaust gas is present ahead on a path;
  perform control to drive in a first mode for charging the battery in power of an engine in a first section disposed before entrance into the specific zone when the current SoC is greater than the first value;
  convert a current mode into a second mode for driving using power of a motor only upon entering a second section that corresponds to the specific zone; and
  battery consumption using at least one step along with a change in the current SoC in the second section;
  wherein the first value is a target minimum SOC at an end point of the second section when completing driving of the whole second section in the second mode;
wherein when the current SoC is equal to or less than the first value, the hybrid controller is configured to block electric power load in a preset first range from the first section,
when the current SoC is less than a second value in the second section, the hybrid controller is configured to block electric power load in a preset second range and the second value is less than the first value,
wherein when the current SoC is less than a third value in the second section, the hybrid controller is configured to prevent use of a preset motor low-efficiency section and the third value is less than the second value, and
wherein the hybrid controller is configured to restrict accelerating force or maximum velocity within a predetermined value or change torque requirement based on manipulation of an accelerating pedal to a value by which entrance into the motor low-efficiency section is not allowed.

3. The hybrid vehicle of claim 2, further comprising:
an output unit configured to output function limit guidance information via the reduction of battery consumption.

4. The hybrid vehicle of claim 2, wherein the specific zone includes a zone in which reduction in exhaust gas discharging is reinforced or recommended.

5. The method of claim 1, wherein the second range includes more types of electric power loads than the first range.

6. The method of claim 1, wherein determining whether a current state of charge (SoC) of a battery is greater than a first value is performed when the vehicle is not capable of driving in the complete second section in the second mode based on the current SoC.

7. The method of claim 1, wherein the first value is determined based on a SoC for completing the second section in the second mode without driving of the engine assuming that the charging is performed in the first section.

8. The method of claim 1, further comprising:
outputting, by the controller, function limit guidance information via the reduction of battery consumption.

9. The method of claim 1, wherein the specific zone includes a zone in which reduction in exhaust gas discharging is reinforced or recommended.

10. A non-transitory computer readable recording medium having recorded thereon a program for executing the driving control method of the hybrid vehicle of claim 1.

11. The hybrid vehicle of claim 2, wherein the second range includes more types of electric power loads than the first range.

12. The hybrid vehicle of claim 2, wherein the hybrid controller is configured to compare the first value and the current SoC when the vehicle is not capable of driving in the whole second section in the second mode based on the current SoC.

13. The hybrid vehicle of claim 2, wherein the first value is determined based on a SoC for completing the second section in the second mode without driving of the engine assuming that the charging is performed in the first section.

* * * * *